June 26, 1956 — J. LEUZINGER — 2,751,663
FACING HEAD, PARTICULARLY FOR THE MILLING OF STEEL, BRONZE AND CAST IRON
Filed Aug. 13, 1952 — 2 Sheets-Sheet 1

JACQUES LEUZINGER
INVENTOR

By Richardson, David and Nordon
his ATTYS.

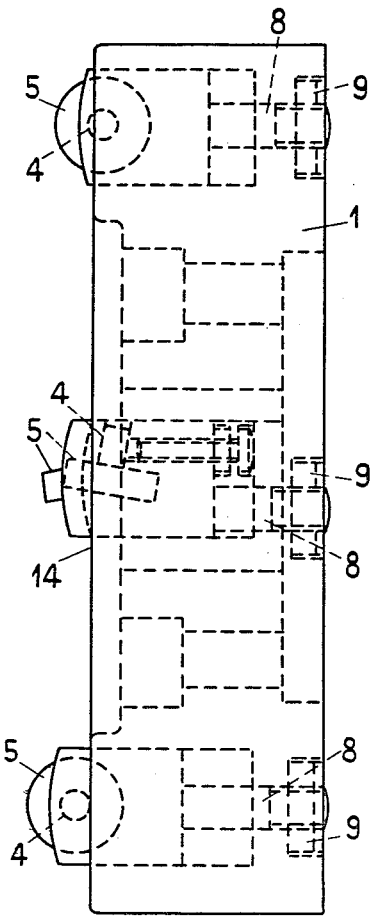
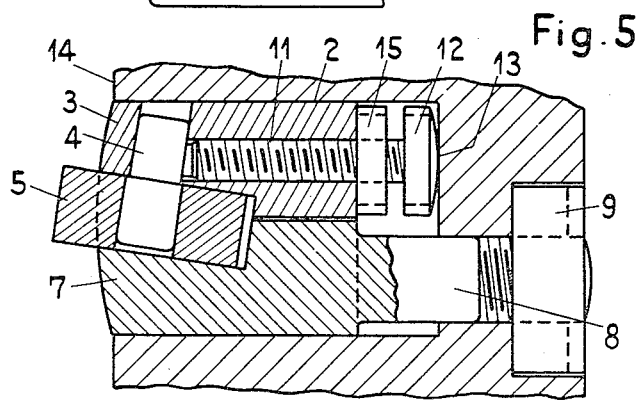

United States Patent Office 2,751,663
Patented June 26, 1956

2,751,663

FACING HEAD, PARTICULARLY FOR THE MILLING OF STEEL, BRONZE AND CAST IRON

Jacques Leuzinger, Zurich, Switzerland, assignor to Stahag Steel & Hard Metal Import Trading Co., Zurich, Switzerland Application August 13, 1952, Serial No. 304,096

1 Claim. (Cl. 29—105)

The invention relates to facing heads, particularly for the milling of steel, bronze and cast iron, and has the main object of providing a facing head the cutting tools of which can be easily attached to and detached from the cutter head, and adjusted within ample limits to any desired distance of their cutting edges from the end face of the said cutter head.

It is another object of the invention to provide a facing head, the cutting tools of which can be kept in good cutting condition for a long working period, and which can be reconditioned easily.

It is yet another object of the invention to provide a facing head, the cutting tools of which can be readily adjusted to the cutting angle most suitable for the material to be machined.

It is still another object of the invention to provide a facing head which allows the milling of a comparatively wide face area and at a comparatively large depth of cut in one operation.

With these and other objects in view I provide a facing head comprising in combination: a cutter head, at least one cylindrical cutter ring consisting wholly of hard metal attached to the said cutter head detachably and rotatably about its own axis and with its end faces inclined both relative to planes perpendicular to the axis of rotation of the said cutter head and to lines parallel to said axis, and clamping means fixing the said cutter ring to the said cutter head so that it projects beyond the end face of the latter.

These and other objects and features of the invention will become clear from the following detailed description of two embodiments thereof given by way of example with reference to the accompanying drawings, and while I describe and illustrate what may be considered typical and particularly useful embodiments, I wish it to be understood that I do not limit myself to the particular details and dimensions illustrated and described, for obvious modifications will occur to a person skilled in the art.

In the drawings:

Fig. 2 is an end elevation thereof, while

Fig. 4 is a lateral elevation of a second embodiment, and Fig. 5 is a part section, similar to Fig. 3, of the embodiment of Fig. 4.

Figure 1:
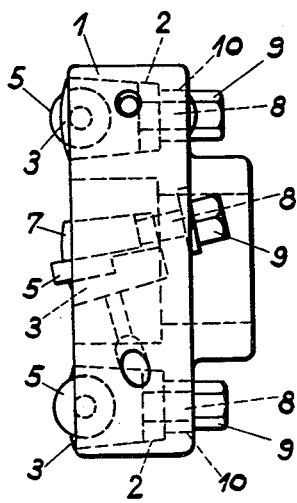
Fig. 1 is a lateral elevation of a first embodiment.
Figure 2:
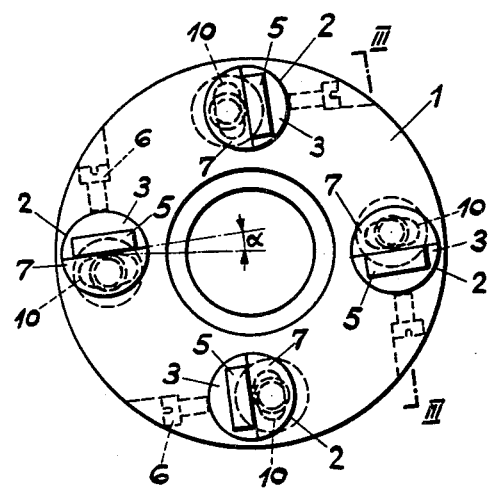
Figure 3:
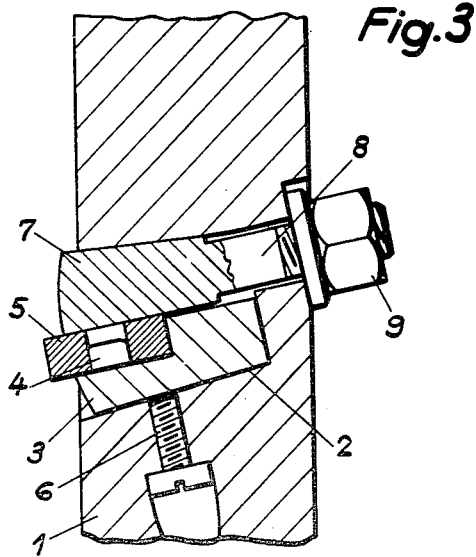
Fig. 3 is a part section on line 3—3 of Fig. 2 on an enlarged scale.

Referring first to Figs. 1 to 3, the new facing head comprises a cutter head 1 which is attached to a cutter spindle (not shown). The end face of the cutter head 1 which faces towards the work piece is completely plane. In the cutter head 1 there is preferably provided a number of frusto-conical bores 2 the longitudinal axes of which are inclined relative to the cutter head axis. In each of the bores 2 there is fitted a holder 3 which has a segmental cross-section. Each of these holders 3 is provided with a mandrel 4 on which is rotatably mounted a cylindrical hard metal ring 5. The holder 3 can be secured in the bore 2 by means of a screw 6. In the said bore there is provided additionally a counter-holder 7 which is likewise segmental in cross section. The counter-holder 7 is provided with a threaded cylindrical shank 8 with a nut 9. The shank 8 extends through a slot 10 of the cutter head. By tightening the nut 9, the counter-holder 7 as well as the holder 3 are immovably clamped in the bore 2. The ring 5 is thereby also held fast in such a manner that it can not rotate. The ring 5 lies with at least two thirds of its end faces clamped between the holder 3 and the counter-holder 7, and is thus practically unaffected by blows.

By the application of a hard metal ring, two ring shaped cutting edges are provided for use, each of which actually cuts with part of one cutting edge only. The remaining parts of the cutting edges are not in use. When the part required is no longer usable for cutting, the nut 9 is undone and the counter-holder 7 is loosened. This gives the possibility of turning the ring 5 and, by subsequently tightening the nut 9, to secure it again. Thereupon a new cutting edge portion is available in working position. If one of the annular cutting edges has been used up, the ring is turned over on its other side and then used again as described hereinabove. After both of the annular cutting edges have been used up, as many as eight rings, for example, could be filed on a mandrel and simultaneously sharpened on a circular sharpening machine (not shown). Additionally, lapping by hand with a diamond sharpening stone or a diamond polishing disc is possible. The rings or the cutting edges thereof are thus again made ready for use.

It is clear that the life period of the rings is many times longer than that of the previously known cutting tools with hard metal inserts. The ring can be turned in 16 to 20 stages until both its cutting edges have to be resharpened. The re-insertion of the rings can be effected without guides.

It is essential that the end faces of the ring include an angle with lines parallel to the cutter head axis and with planes perpendicular to this axis. The magnitude of the angle α (Fig. 2) depends on the material to be machined. As the holder 3 and the counter-holder 7 supplement one another in cross section to a split body of rotation, they can be readily turned in the bore 2, and thereby the angle α can be suited to the material desired. With the exception of the bore for the screw 6 and the cutaway for the head thereof, the whole cutter head remains substantially the same for any material. Naturally, there need not be four rings in the cutter head (as shown), and alternatively less or more of them could be used. Furthermore, the new facing head can be used for the machining of steel and bronze without alteration of its setting for the machining of cast iron.

The embodiment according to Figs. 4 and 5 is based on the same idea as the embodiment according to Figs. 1 to 3, with the difference, however, that the individual hard metal rings are adjustable in their extent of projection beyond the end face of the cutter head. It is accordingly made possible to vary the depth of the cut within a comparatively wide range.

In Figs. 4 and 5, the cutter head is denoted 1', and cylindrical bores 2' are arranged therein, the axes of which are parallel to the axis of the cutter head. In each bore there is a holder 3' of semi-circular cross section which carries a hard metal ring 5' rotatably on an obliquely positioned mandrel 4'. By means of the screw 11' which bears with its head 12' on an inner abutment face 13' at the bottom of the bore 2' the said holder 3' can be adjusted in its axial position relative to the end face 14' of the cutter head 1'. For the fixing of the screw 11' in its adjusted position a locking nut 15' is provided.

In the bore 2' there is housed moreover a counter-holder 7' which is substantially semi-cylindrical, too, and which carries at its rear end a threaded shank 8' which can be adjusted and fixed relative to the cutter head 1' by means of a nut 9'.

The embodiment described hereinabove has the same advantages as the embodiment according to Figs. 1 to 3. In particular, it is possible here, too, to make use of both circular edges of the hard metal ring 5' as cutting edges. In addition, the advantage is attained that the individual rings 5' can be adjusted to project to a different extent beyond the end face 14' of the cutter head 1' (as indicated in Fig. 4, these magnitudes varying e. g. from 1 to 12 millimetres), whereby in the same operation a very large volume of turnings can be machined off. The individual rings 5' can advantageously be arranged at different radii of the cutter head, so that each ring may operate on a different zone and/or at a different projection from the end face 14' of the cutter head 1'. Obviously the rings 5' could be arranged in groups on the same diameters and to the same magnitude of projection, if desired.

What I claim as my invention and desire to secure by Letters Patent, is:

A facing head of the type employing at least one revolving and releasing cutter secured in the head, said head being provided with at least one frusto-conical recess and including frusto-conical clamping means disposed in said recess, said clamping means including a holder portion and a counter-holder portion complementary therewith and defining therebetween a seat for a segment of a cylindrical ring, which seat is spaced from the wall defining said recess, a mandrel on one of said portions and extending axially of the seat defined therebetween, a cylindrical cutter ring rotatably disposed about said mandrel on said seat and up to about one-third of said ring projecting outwardly of said recess, screw means on one of said portions and extending through said facing head, and means for tightening said screw means to thereby withdraw said one portion into said recess, whereby said cutter ring is held securely between said portions thereby preventing rotation.

References Cited in the file of this patent
UNITED STATES PATENTS

| | | |
|---|---|---|
| 1,460,029 | Mattson | June 26, 1923 |
| 1,460,030 | Mattson | June 26, 1923 |
| 1,914,411 | Earl | June 20, 1933 |
| 2,648,893 | Begle et al. | Aug. 18, 1953 |
| 2,664,617 | Kralowetz | Jan. 5, 1954 |

FOREIGN PATENTS

| | | |
|---|---|---|
| 587,854 | Great Britain | May 7, 1947 |
| 680,231 | Germany | Aug. 24, 1939 |
| 707,691 | Great Britain | Apr. 21, 1954 |